(12) United States Patent
Lee et al.

(10) Patent No.: US 9,088,698 B2
(45) Date of Patent: Jul. 21, 2015

(54) ELECTRONIC DEVICE AND METHOD FOR CONTROLLING PAN-TILT-ZOOM CAMERAS

(75) Inventors: Hou-Hsien Lee, New Taipei (TW);
Chang-Jung Lee, New Taipei (TW);
Chih-Ping Lo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 404 days.

(21) Appl. No.: 13/571,359

(22) Filed: Aug. 10, 2012

(65) Prior Publication Data
US 2013/0176439 A1    Jul. 11, 2013

(30) Foreign Application Priority Data

Jan. 11, 2012 (TW) .............................. 101101154 A

(51) Int. Cl.
*H04N 7/18* (2006.01)
*H04N 5/232* (2006.01)
(52) U.S. Cl.
CPC .............. *H04N 7/18* (2013.01); *H04N 5/23206* (2013.01); *H04N 5/23296* (2013.01)
(58) Field of Classification Search
USPC ........................................................ 348/159
See application file for complete search history.

(56) References Cited

U.S. PATENT DOCUMENTS

| 6,335,758 B1 * | 1/2002 | Ochi et al. ..................... 348/335 |
| 2012/0127310 A1 * | 5/2012 | Kim .............................. 348/148 |
| 2012/0188333 A1 * | 7/2012 | Morison et al. ................. 348/39 |

FOREIGN PATENT DOCUMENTS

WO           2006120596 A2    11/2006

* cited by examiner

*Primary Examiner* — Tracy Li
(74) *Attorney, Agent, or Firm* — Novak Druce Connolly Bove + Quigg LLP

(57) ABSTRACT

An electronic device receives an image of a monitored area captured a pan-tilt-zoom (PTZ) camera. When the electronic device rotates, rotation information of the electronic device relative to a previous position state of the electronic device is detected by an electronic gyroscope. The electronic device converts the rotation information of the electronic device into rotation information of a lens of the PTZ camera relative to a present position of the lens according to preset association, generates a first control command according to rotation information of the lens, and control the lens of the PTZ camera to move from the present position to a new position according to the first control command. The electronic device receives a new image of the monitored area that is captured by the lens of the PTZ camera at the new position.

15 Claims, 5 Drawing Sheets

ELECTRONIC DEVICE AND METHOD FOR CONTROLLING PAN-TILT-ZOOM CAMERAS

BACKGROUND

1. Technical Field

The embodiments of the present disclosure relate to remote control systems and methods, and more particularly to an electronic device and a method for controlling pan-tilt-zoom cameras.

2. Description of Related Art

Pan-tilt-zoom (PTZ) cameras are widely used for security surveillance. Often, a PTZ camera is connected to a control center via a wired connection or a wireless connection. A user at the control center can view real-time images captured by the PTZ camera via a monitor screen, and send control commands to control movements of the PTZ camera via a controller, especially when an abnormality appears in the real-time images. One problem is that, if the user leaves the control center, he/she cannot view the real-time images captured by the PTZ camera and send the control commands to the PTZ camera.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language. One or more software instructions in the modules may be embedded in firmware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
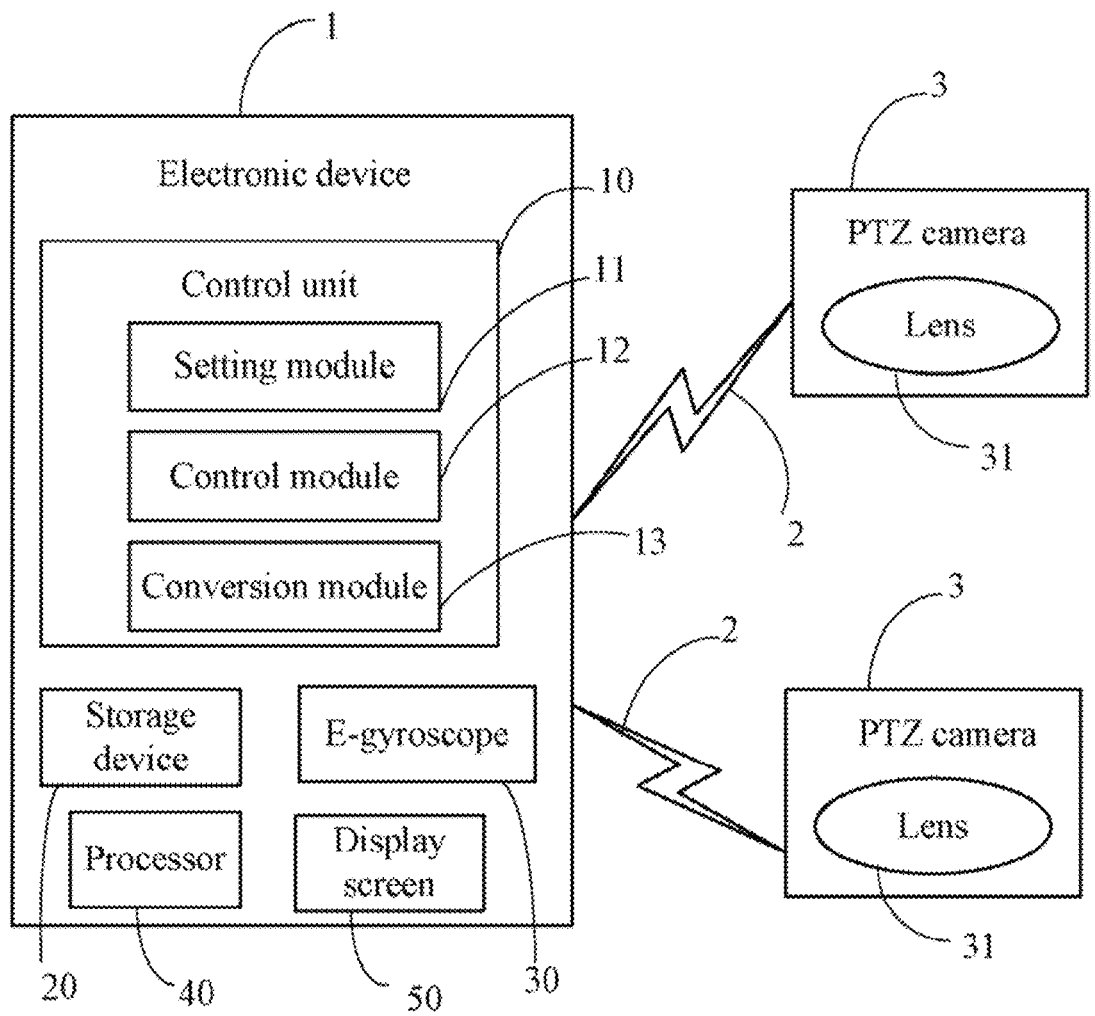
FIG. 1 is a block diagram of one embodiment of an electronic device including a control unit for controlling PTZ cameras.

FIG. 1 is a block diagram of one embodiment of an electronic device 1. The electronic device 1 communicates with one or more PTZ cameras 3 via a network 2. As shown in FIG. 1, the electronic device 1 includes a control unit 10, a storage device 20, an electronic gyroscope 30 ("e-gyroscope 30"), a processor 40, and a display screen 50. The electronic device 1 accesses each PTZ camera 3 via the network 2, receives images of a monitored area captured by the PTZ camera 3 via the network 2, and displays the images on the display screen 50. The storage device 20 stores information in relation to each PTZ camera 30, such as an identifier, a location, an IP address, and a specification of the PTZ camera 30. In one embodiment, the storage device 20 is a dedicated memory, such as an EPROM, a hard disk driver (HHD), or a flash memory. The display screen 50 may be an ordinary display (such a liquid crystal display) or a touch screen.

The control unit 10 defines a first association between a rotation operation of the electronic device 1 and a rotation operation of a lens 31 of a PTZ camera 31, and a second association between a zoom adjustment of an image of a monitored area captured by the PTZ camera 3 and displayed on the electronic device, and a zoom adjustment of a focal length of the lens 31 of the PTZ camera 3. In one embodiment, the lens 31 is a zoom lens.

Figure 3A:
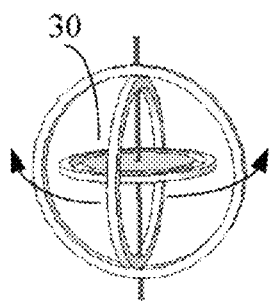
FIG. 3A illustrates one embodiment of an electronic-gyroscope (e-gyroscope) included in the electronic device in FIG. 1.

When the electronic device 1 rotates according to a longitudinal axis or a latitudinal axis of the electronic device 1, the e-gyroscope 30 detects a first rotation orientation and a first rotation angle of the electronic device 1 relative to a previous position state of the electronic device 1. FIG. 3A illustrates one embodiment of the e-gyroscope 30. The control unit 10 converts the first rotation orientation and the first rotation angle of the electronic device 1 into a second rotation orientation and a second rotation angle of the lens 31 of the PTZ camera 3 according to the first association, generates a control command according to the second rotation orientation and the second rotation angle, and controls the lens 31 of the PTZ camera 3 to move from a present position to a new position according to the control command. Furthermore, the control unit 10 receives an image of the monitored area captured by the PTZ camera 3 at the new position, and displays the image on the display screen 50.

As shown in FIG. 1, the control unit 10 includes a setting module 11, a control module 12, and a conversion module 13. The module 11-13 may include computerized code in the form of one or more programs that are stored in the storage device 20. The processor 40 executes the computerized code to provide the functions of the control unit 10 as described above. A detailed description of functions of the modules 11-13 is given below in the descriptions regarding FIG. 2A and FIG. 2B.

Figure 2A:
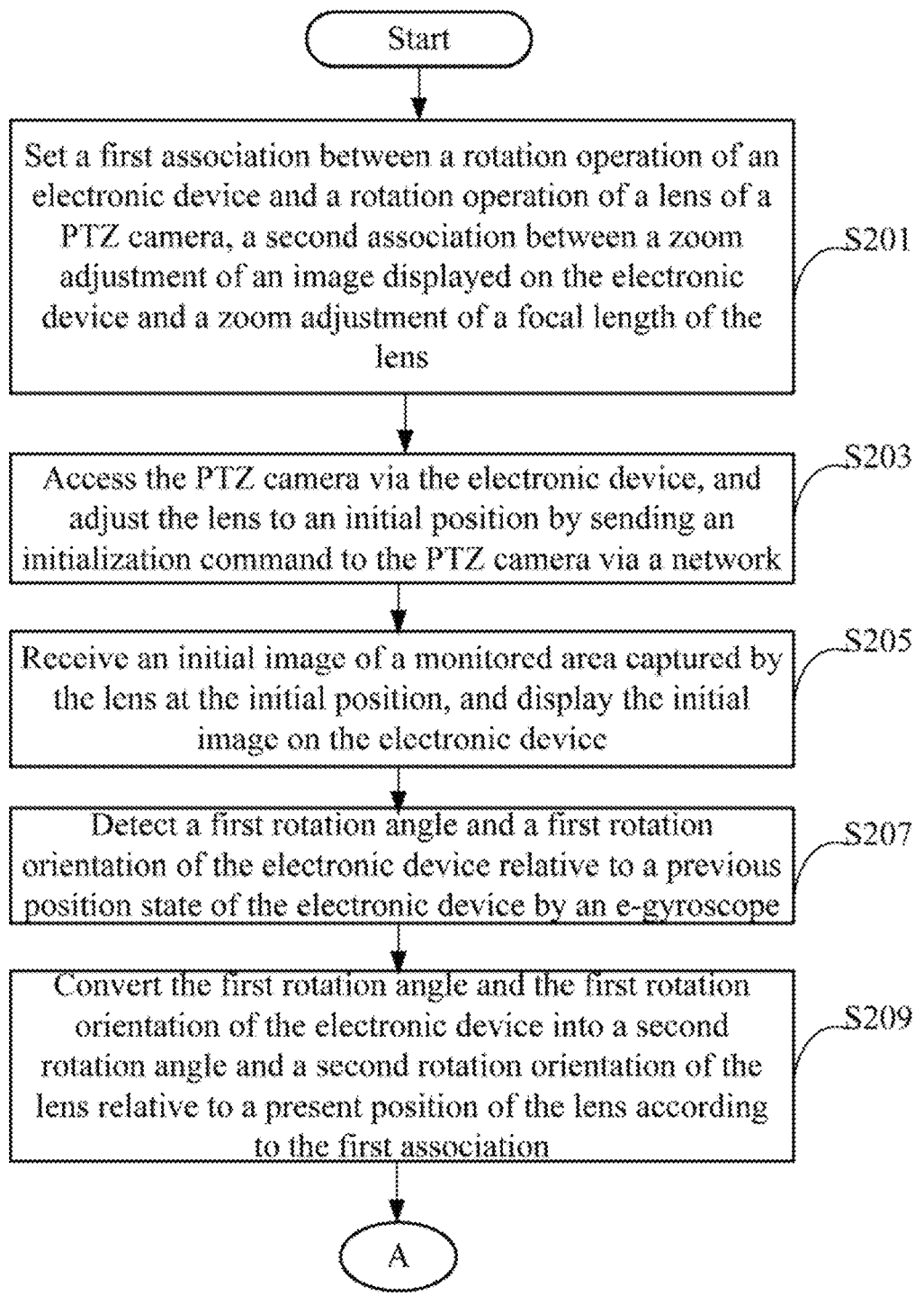
FIG. 2A and FIG. 2B are flowcharts of one embodiment of a method for controlling PTZ cameras.
Figure 2B:
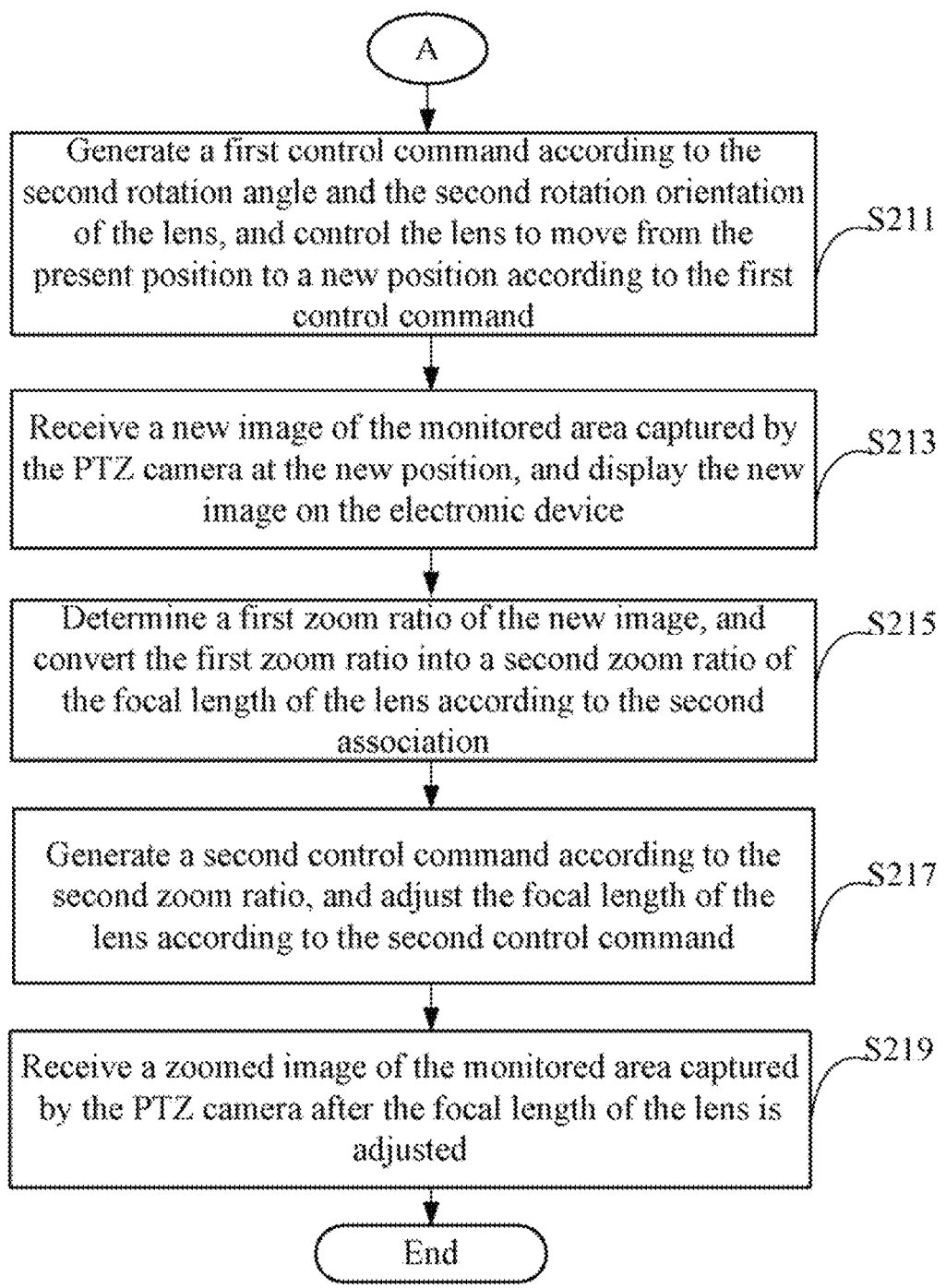

FIG. 2A and FIG. 2B are flowcharts of one embodiment of a method for controlling PTZ cameras 3 using the electronic device 1. Depending on the embodiment, additional steps may be added, others removed, and the ordering of the steps may be changed.

In step S201, the setting module 11 sets a first association between a rotation operation of the electronic device 1 and a rotation operation of a lens 31 of a PTZ camera 31, and sets a second association between a zoom adjustment of an image of a monitored area, captured by the PTZ camera 3 and displayed on the display screen 50 of the electronic device 1, and a zoom adjustment of a focal length of the lens 31 of the PTZ camera 3. The setting module 11 may further define a level state of the electronic device 1. In one level state example, the electronic device 1 is perpendicular to a horizontal desktop, and an upper side of the display screen 50 is facing a user of the electronic device 1. In another level state example, the electronic device 1 may be defined as being parallel to the horizontal desktop, and the upper side of the display screen 20 facing upwards.

In this embodiment, the electronic device 1 may rotate leftwards or rightwards according to a longitudinal axis or a latitudinal axis of the electronic device 1. The first association may be defined according to a first formula: b=n1×a+n2, where n1, n2 are constants, "a" represents a rotation angle of the electronic device 1 relative to a present position state (such as the level state) of the electronic device 1, and "b" represents a rotation angle of the lens 31 of the PTZ camera 3. When both "a", "b" are positive or negative, a rotation orientation of the lens 31 of the PTZ camera 3 is regarded as the same as a rotation orientation of the electronic device 1. Otherwise, when one of "a" and "b" is positive and the other one of "a" and "b" is negative, the rotation orientation of the lens 31 of the PTZ camera 3 is regarded as different from the rotation orientation of the electronic device 1.

The second association may be set according to a second formula: c=m1×z+m2, where m1, m2 are constants, "z" represents a zoom ratio of the image displayed on the display screen 50, "c" represents a zoom ratio of the lens 31 of the PTZ camera 3. When both "z" and "c" are positive or negative, a zoom-in operation of the image is regarded as corresponding to a zoom-in operation of the lens 31 of the PTZ camera 3, and a zoom-out operation of the image is regarded as corresponding to a zoom-out operation of the lens 31 of the PTZ camera 3. Otherwise, when one of "c" and "z" is positive and the other one of "c" and "z" is negative, the zoom-in operation of the image is regarded as corresponding to the zoom-out operation of the lens 31 of the PTZ camera 3, and the zoom-out operation of the image is regarded as corresponding to the zoom-in operation of the lens 31 of the PTZ camera 3.

In step S203, when a user selects to access one PTZ camera 3 on the electronic device 1, the control module 12 adjusts the lens 31 of the selected PTZ camera 3 to an initial position by sending an initial command to the selected PTZ camera 3.

Figure 3B:
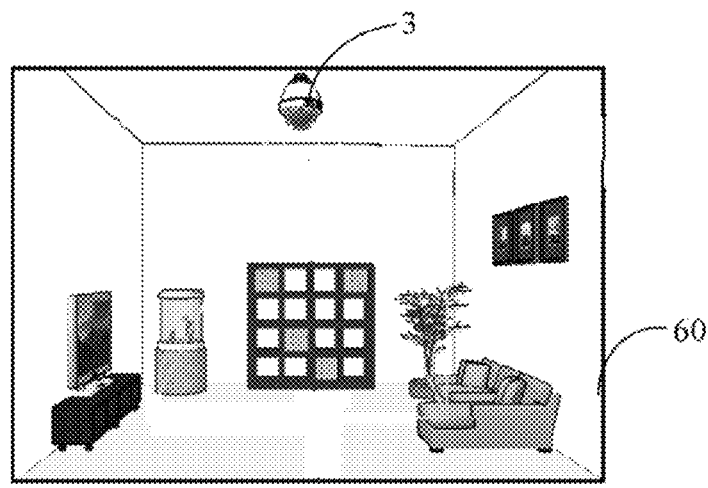
FIG. 3B illustrates one embodiment of a monitored area installed with a PTZ camera.
Figure 3C:
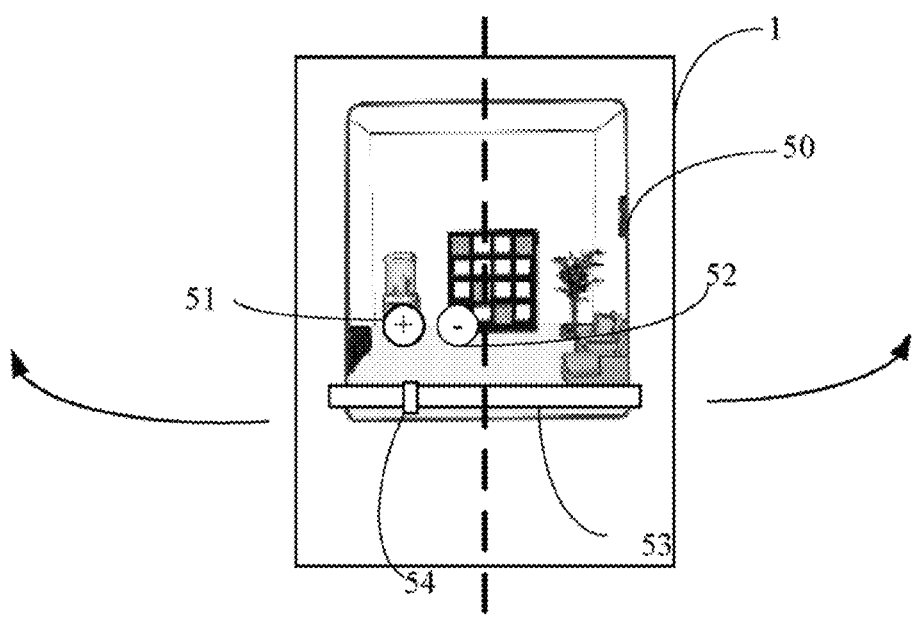
FIG. 3C illustrates one embodiment of an initial image of the monitored area, which is captured by the PTZ camera and displayed on a display screen of the electronic device in FIG. 1.

In step S205, the electronic device 1 receives an initial image of the monitored area, captured by the lens 31 of selected PTZ camera 3 at the initial position and sent via the network 2. FIG. 3B illustrates the monitored area (labeled as 60) installed with the selected PTZ camera 3, and FIG. 3C illustrates the initial image captured by the selected PTZ camera 3 and displayed on the display screen 50.

In step S207, the e-gyroscope 30 detects a first rotation angle and a first rotation orientation of the electronic device 1 relative to a previous position state (such as the level state) when the electronic device 1 rotates according to a longitudinal axis or a latitudinal axis of the electronic device 1. For example, as shown in FIG. 3C, the broken line represents the longitudinal axis of the electronic device 1, and the electronic device 1 may rotate leftwards or rightwards according to the longitudinal axis.

In step S209, the conversion module 13 converts the first rotation angle and the first rotation orientation of the electronic device 1 into a second rotation angle and a second rotation orientation of the lens 31 of the selected PTZ camera 3 relative to a present position (such as the initial position) of the lens 31 according to the first association. For example, when the electronic device 1 rotates leftwards by sixty degrees relative to the level state, the lens 31 of the selected PTZ camera 3 may be determined to rotate leftwards or rightwards by thirty degrees relative to the initial position according to the first association.

In step S211, the control module 12 generates a first control command according to the second rotation angle and the second rotation orientation of the lens 31, and controls the lens 31 of the selected PTZ camera 3 to move from the present position (such as the initial position) to a new position according to the first control command via the network. For example, the lens 31 of the selected PTZ camera 3 may be rotated leftwards or rightwards by thirty degrees from the initial position.

Figures 4A, 4B, 4C:
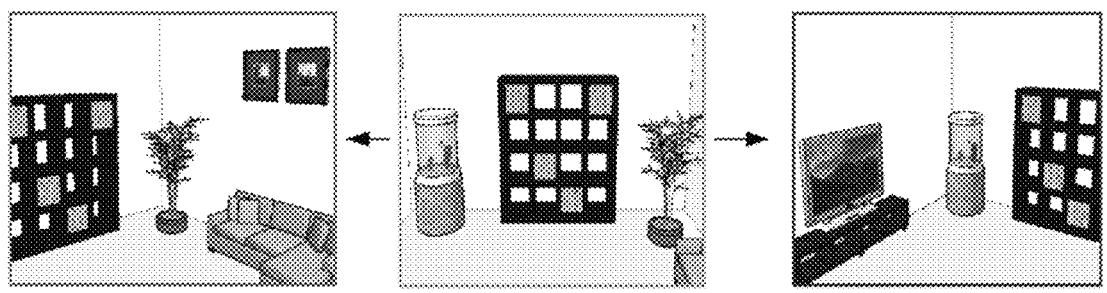
FIG. 4A shows one embodiment of an image of a monitored area captured by a PTZ camera at a present position.
FIG. 4B shows one embodiment of a new image of the monitored area captured by the PTZ camera after rotating leftwards from the present position.
FIG. 4C shows one embodiment of an image of the monitored area captured by the PTZ camera after rotating rightwards from the present position.

In step S213, the electronic device 1 receives a new image of the monitored area, captured by the lens 31 of the selected PTZ camera 3 at the new position, and displays the new image on the display screen 50. For example, FIG. 4A is a present image (similar to the initial image shown in FIG. 3C) of the monitored area captured by the lens 31 of the selected PTZ camera 3 at the present position (such as the initial position). FIG. 4B is a new image of the monitored area captured by the lens 31 of the selected PTZ camera 31 after rotating leftwards by thirty degrees from the present position. FIG. 4C a new image of the monitored area, which is captured by the lens 31 of the selected PTZ camera 31 after rotating rightwards by thirty degrees from the present position.

In step S215, the electronic device 1 receives a first zoom ratio of the new image. As shown in FIG. 3C, the display screen 50 displays a zoom-in button 51, a zoom-out button 52, and a zoom ratio adjustment bar 53. A user can select the zoom-in button 51 or the zoom-out button 52 to zoom in or zoom out the new image, and set the first zoom ratio by operating the zoom ratio adjustment bar 53. The conversion module 13 converts the first zoom ratio into a second zoom ratio of the focal length of the lens 31 of the selected PTZ camera 3 according to the second association. For example, if the first zoom ratio is magnifying the new image by 0.5 times, the second zoom ratio may be determined as increasing a focal length of the lens 31 by 5 millimeters.

In step S217, the control module 12 generates a second control command according to the second zoom ratio, and adjusts the focal length of the lens 31 of the selected PTZ camera 3 according to the second control command via the network 2. For example, the focus length of the lens 31 of the selected PTZ camera 3 may be increased by 5 millimeters.

In step S219, the electronic device 1 receives a zoomed image of the monitored area, which is captured by the lens 31 of the selected PTZ camera 3 after adjusting the focal length of the lens 31, and displayed the zoomed image on the display screen 50.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A method being executed by a processor of an electronic device for controlling one or more pan-tilt-zoom (PTZ) cameras connected to the electronic device via a network, the method comprising:

setting a first association between a rotation operation of the electronic device and a rotation operation of a lens of a PTZ camera, and a second association between a zoom adjustment of an image of a monitored area and a zoom adjustment of a focal length of the lens, wherein the image is captured by the PTZ camera and displayed on a display screen of the electronic device, wherein the first association and the second association are set according to formulas, enabling the rotation operations between the electronic device and the lens of the PTZ camera, and the zoom adjustments between the image of the monitored area and the focal length of the lens to be the same, proportionate, and/or opposite;

accessing the PTZ camera via the network, and adjusting the lens of the PTZ camera to an initial position by sending an initial command to the PTZ camera;

receiving an initial image of the monitored area captured by the lens of the PTZ camera at the initial position and sent via the network, and displaying the initial image on the display screen;

detecting a first rotation angle and a first rotation orientation of the electronic device relative to a previous position state of the electronic device when the electronic device rotates;

converting the first rotation angle and the first rotation orientation of the electronic device into a second rotation angle and a second rotation orientation of the lens of the PTZ camera relative to a present position of the lens according to the first association;

generating a first control command according to the second rotation angle and the second rotation orientation of the lens, and controlling the lens of the PTZ camera to move from the present position to a new position according to the first control command; and receiving a new image of the monitored area captured by the lens of the PTZ camera at the new position, and displaying the new image on the display screen.

2. The method of claim 1, further comprising:

setting a first zoom ratio of the new image, and converting the first zoom ratio into a second zoom ratio of the focal length of the lens of the PTZ camera according to the second association;

generating a second control command according to the second zoom ratio, and adjusting the focal length of the lens of the PTZ camera according to the second control command; and receiving a zoomed image of the monitored area captured by the lens of the PTZ camera after the focal length of the lens is adjusted, and displaying the zoomed image on the display screen.

3. The method of claim 2, wherein the first zoom ratio is set by manipulation of zoom buttons displayed on the display screen, and the zoom buttons comprise a zoom-in button, a zoom-out button, and a zoom ratio adjustment bar.

4. The method of claim 3, wherein the first zoom ratio is determined by operating the zoom ratio adjustment bar.

5. The method of claim 1, wherein the electronic device rotates leftwards or rightwards according to a longitudinal axis or a latitudinal axis of the electronic device.

6. An electronic device being connected with one or more pan-tilt-zoom (PTZ) cameras via a network, the electronic device comprising:

a storage device;

a processor; and one or more programs that are stored in the storage device and executed by the processor, the one or more programs comprising instructions to:

set a first association between a rotation operation of the electronic device and a rotation operation of a lens of a PTZ camera, and a second association between a zoom adjustment of an image of a monitored area and a zoom adjustment of a focal length of the lens, wherein the image is captured by the PTZ camera and displayed on a display screen of the electronic device, wherein the first association and the second association are set according to formulas enabling the rotation operations between the electronic device and the lens of the PTZ camera, and the zoom adjustments between the image of the monitored area and the focal length of the lens to be the same, proportionate, and/or opposite;

access the PTZ camera via the network, and adjust the lens of the PTZ camera to an initial position by sending an initial command to the PTZ camera;

receive an initial image of the monitored area captured by the lens of the PTZ camera at the initial position and sent via the network, and display the initial image on the display screen;

detect a first rotation angle and a first rotation orientation of the electronic device relative to a previous position state of the electronic device when the electronic device rotates;

convert the first rotation angle and the first rotation orientation of the electronic device into a second rotation angle and a second rotation orientation of the lens of the PTZ camera relative to a present position of the lens according to the first association;

generate a first control command according to the second rotation angle and the second rotation orientation of the lens, and control the lens of the PTZ camera to move from the present position to a new position according to the first control command; and receive a new image of the monitored area captured by the lens of the PTZ camera at the new position, and display the new image on the display screen.

7. The electronic device of claim 6, wherein the one or more programs further comprise instructions to:

set a first zoom ratio of the new image, and convert the first zoom ratio into a second zoom ratio of the focal length of the lens of the PTZ camera according to the second association;

generate a second control command according to the second zoom ratio, and adjust the focal length of the lens of the PTZ camera according to the second control command; and receive a zoomed image of the monitored area captured by the lens of the PTZ camera after the focal length of the lens is adjusted, and display the zoomed image on the display screen.

8. The electronic device of claim 7, wherein the first zoom ratio is set by manipulation of zoom buttons displayed on the display screen, and the zoom buttons comprise a zoom-in button, a zoom-out button, and a zoom ratio adjustment bar.

9. The electronic device of claim 8, wherein the first zoom ratio is determined by operating the zoom ratio adjustment bar.

10. The electronic device of claim 6, wherein the electronic device rotates leftwards or rightwards according to a longitudinal axis or a latitudinal axis of the electronic device.

11. A non-transitory storage medium storing a set of instructions, the set of instructions capable of being executed by a processor of an electronic device to perform a method for controlling one or more pan-tilt-zoom (PTZ) cameras connected to the electronic device via a network, the method comprising:

setting a first association between a rotation operation of the electronic device and a rotation operation of a lens of a PTZ camera, and a second association between a zoom adjustment of an image of a monitored area and a zoom adjustment of a focal length of the lens, wherein the image is captured by the PTZ camera and displayed on a display screen of the electronic device, wherein the first association and the second association are set according to formulas enabling the rotation operations between the electronic device and the lens of the PTZ camera, and the zoom adjustments between the image of the monitored area and the focal length of the lens to be the same, proportionate, and/or opposite;

accessing the PTZ camera via the network, and adjusting the lens of the PTZ camera to an initial position by sending an initial command to the PTZ camera;

receiving an initial image of the monitored area captured by the lens of the PTZ camera at the initial position and sent via the network, and displaying the initial image on the display screen;

detecting a first rotation angle and a first rotation orientation of the electronic device relative to a previous position state of the electronic device when the electronic device rotates;

converting the first rotation angle and the first rotation orientation of the electronic device into a second rotation angle and a second rotation orientation of the lens of the PTZ camera relative to a present position of the lens according to the first association;

generating a first control command according to the second rotation angle and the second rotation orientation of the lens, and controlling the lens of the PTZ camera to move from the present position to a new position according to the first control command; and receiving a new image of the monitored area captured by the lens of the PTZ camera at the new position, and displaying the new image on the display screen.

12. The medium of claim 11, wherein the method further comprises:

setting a first zoom ratio of the new image, and converting the first zoom ratio into a second zoom ratio of the focal length of the lens of the PTZ camera according to the second association;

generating a second control command according to the second zoom ratio, and adjusting the focal length of the lens of the PTZ camera according to the second control command; and receiving a zoomed image of the monitored area captured by the lens of the PTZ camera after the focal length of the lens is adjusted, and displaying the zoomed image on the display screen.

13. The medium of claim 12, wherein the first zoom ration is set by manipulation of zoom buttons displayed on the display screen, and the zoom buttons comprise a zoom-in button, a zoom-out button, and a zoom ratio adjustment bar.

14. The medium of claim 13, wherein the first zoom ratio is determined by operating the zoom ratio adjustment bar.

15. The medium of claim 11, wherein the electronic device rotates leftwards or rightwards according to a longitudinal axis or a latitudinal axis of the electronic device.

* * * * *